US009852827B2

(12) United States Patent
Koeppendoerfer et al.

(10) Patent No.: US 9,852,827 B2
(45) Date of Patent: Dec. 26, 2017

(54) DATA CABLE AND MOTOR VEHICLE WITH THE DATA CABLE

(71) Applicant: LEONI KABEL HOLDING GMBH, Nuernberg (DE)

(72) Inventors: Erwin Koeppendoerfer, Schwabach (DE); Rainer Poehmerer, Winkelhaid (DE); Stefanie Pfister, Effeltrich (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 0 days.

(21) Appl. No.: 15/095,628

(22) Filed: Apr. 11, 2016

(65) Prior Publication Data

US 2016/0225487 A1 Aug. 4, 2016

Related U.S. Application Data

(63) Continuation of application No. PCT/EP2015/052329, filed on Feb. 4, 2015.

(30) Foreign Application Priority Data

Feb. 6, 2014 (DE) ........................ 10 2014 202 214
Apr. 25, 2014 (DE) ........................ 10 2014 207 781

(51) Int. Cl.

| | |
|---|---|
| ***H02G 15/04*** | (2006.01) |
| ***H02G 15/013*** | (2006.01) |
| ***H01B 7/02*** | (2006.01) |
| ***H01B 7/18*** | (2006.01) |
| ***H01B 11/00*** | (2006.01) |
| *H01B 11/06* | (2006.01) |

(52) U.S. Cl.

CPC ......... *H01B 7/0216* (2013.01); *H01B 7/1875* (2013.01); *H01B 11/002* (2013.01); *H01B 11/005* (2013.01); *H01B 11/06* (2013.01)

(58) Field of Classification Search

CPC .... B60R 16/0215; H01B 3/441; H01B 3/443; H01B 3/446; H01B 7/29; H01B 7/185;
(Continued)

(56) References Cited

U.S. PATENT DOCUMENTS

| | | | | |
|---|---|---|---|---|
| 6,147,309 A * | 11/2000 | Mottine | ................. | H01B 3/441 174/110 PM |
| 2006/0102376 A1* | 5/2006 | Kuchita | ................. | H01B 3/446 174/102 SC |

(Continued)

FOREIGN PATENT DOCUMENTS

| | | |
|---|---|---|
| DE | 19940229 A1 | 3/2001 |
| GB | 499396 A | 1/1939 |
| JP | S4978786 U | 7/1974 |

OTHER PUBLICATIONS

Japan Institute of Invention and Innovation Laid-open Publication No. 2005-504545, Aug. 5, 2005—Statement of Relevance.

*Primary Examiner* — Timothy Thompson
*Assistant Examiner* — Guillermo Egoavil
(74) *Attorney, Agent, or Firm* — Laurence A. Greenberg; Werner H. Stemer; Ralph E. Locher

(57) ABSTRACT

A novel data cable achieves good transmission quality in automotive Internet applications. The data cable has a transmission core with only a single stranded conductor pair or four conductors stranded together to form a quad. The transmission core is surrounded by a jacket having a high air content. The jacket may be a foamed sheath, or alternatively at least one spacer element that defines an annular sheath space with air gaps around the transmission core.

22 Claims, 2 Drawing Sheets

(58) Field of Classification Search
CPC ...... H01B 7/188; H01B 7/189; H01B 7/0216; H01B 7/226; H01B 7/292; H01B 7/295; H01B 7/1875; H01B 9/02; H01B 9/022; H01B 9/023; H01B 9/027; H01B 9/028; H01B 11/002; H01B 11/04; H01B 11/005; H01B 11/06; H01B 11/20; H01B 13/14; H02G 3/0481; Y10T 29/49227
USPC ....... 29/887; 174/74 R, 102 SC, 103, 102 R, 174/110 PM, 113 C, 113 R, 116, 121 A, 174/126.1
See application file for complete search history.

(56) References Cited

U.S. PATENT DOCUMENTS

| | | | | |
|---|---|---|---|---|
| 2006/0105613 | A1* | 5/2006 | Carroll | H01R 13/582 439/404 |
| 2006/0169479 | A1* | 8/2006 | Dillon | H01B 11/04 174/113 R |
| 2009/0236119 | A1 | 9/2009 | Wessels, Jr. | |
| 2010/0181093 | A1 | 7/2010 | Wiekhorst et al. | |
| 2011/0005806 | A1* | 1/2011 | Vexler | H01B 11/06 174/116 |
| 2011/0048767 | A1 | 3/2011 | Johnston et al. | |
| 2011/0253414 | A1* | 10/2011 | Dewberry | H01B 9/02 174/102 R |
| 2012/0077371 | A1* | 3/2012 | Fix | H02G 3/32 439/497 |
| 2013/0094821 | A1* | 4/2013 | Logan | G02B 6/4495 385/100 |
| 2015/0034358 | A1* | 2/2015 | Armbrecht | H01B 11/20 174/103 |

* cited by examiner

DATA CABLE AND MOTOR VEHICLE WITH THE DATA CABLE

CROSS-REFERENCE TO RELATED APPLICATION

This application is a continuation, under 35 U.S.C. §120, of copending international application No. PCT/EP2015/052329, filed Feb. 4, 2015, which designated the United States; this application also claims the priority, under 35 U.S.C. §119, of German patent application No. DE 10 2014 202 214.2, filed Feb. 6, 2014, and of German patent application DE 10 2014 207 781.8, filed Apr. 25, 2014; the prior applications are herewith incorporated by reference in their entirety.

BACKGROUND OF THE INVENTION

Field of the Invention

The invention relates to a data cable for transmitting data signals in the high frequency range, for example in the megahertz or gigahertz range, and to a motor vehicle having such a data cable.

Ethernet technology is known for the transmission of data and is also in particular increasingly used in motor vehicles. Automobile Ethernet lines are usually composed in this context of merely one conductor pair, whereas in customary domestic installation lines, for example, of the category CAT 5, CAT 6, typically four pairs are combined in one data cable. In the field of automobiles, the data lines are frequently embodied without a pair screen, that is to say a respective conductor pair is not provided with screening. A respective conductor pair is typically stranded together. Furthermore, so-called quad strandings, in particular star quads, in which four conductors are stranded to one another, are known.

In such non-screened lines, the high-frequency fields also propagate in the outer region, that is to say, in particular, in the sheath surrounding the respective conductor pairs or the quad stranding. The sheath therefore influences the transmission quality and the transmission loss of a high-frequency data cable.

With these transmissions, the undesired transmission of energy from one cable to other cables or the irradiation of high-frequency fields into the transmission system is also disruptive here. This behavior is known as crosstalk in the technology. The "alien-next", which describes the irradiation between different services or cables in the same cable harness, is to be considered an extension of the known crosstalk. A transmission system can only compensate a limited quantity of irradiated energy without operating incorrectly.

SUMMARY OF THE INVENTION

It is accordingly an object of the invention to provide a data cable which overcomes the above-mentioned and other disadvantages of the heretofore-known devices and methods of this general type and which specifies a data cable with improved transmission properties.

With the foregoing and other objects in view there is provided, in accordance with the invention, a data cable, comprising:

a transmission core having a single stranded conductor pair or four conductors that are stranded to form quad stranding, each conductor having a line and a conductor insulation sheathing said line;

a jacket with a high proportion of air surrounding said transmission core, said jacket being selectively formed by a foamed sheath or at least one spacer element which defines an annular sheath space with free air spaces around said transmission core.

In other words, the novel data cable has a transmission core which is formed by merely one stranded conductor pair or alternatively by means of a quad stranding composed of four conductors which are stranded to one another, in particular, as star quads. Each of the conductors is composed here of a line and a conductor insulation which surrounds it. The transmission core is, in particular, non-screened here. In order to reduce the transmission losses and/or to reduce external interference influences, the transmission core is surrounded by a jacket with a high proportion of air or gas. This jacket with a high proportion of air is formed here by means of a foamed sheath or by means of at least one spacer element which defines an annular sheath space around the transmission core with open air spaces.

The jacket is expediently applied concentrically to the transmission core, and the jacket and transmission core are therefore arranged strictly coaxially with respect to one another. The transmission properties are influenced positively by this high degree of symmetry.

The cable is, in particular, an automobile Ethernet line which are usually formed by a single conductor pair which is surrounded directly by an insulation sheath (outer sheath). The standard plugs for such a data cable are usually comparatively small in size and require a small cable diameter, that is to say the diameter of the outer sheath in the region of merely a few millimeters, for example 3 mm.

In an expedient embodiment, according to a first basic variant the jacket with the high proportion of air is arranged with intermediate positioning of an intermediate sheath and forms an outer sheath. The outer sheath is understood here to be, in particular, the outermost sheath which surrounds the transmission core concentrically. Therefore, there is no further concentric layer or coating arranged around the outer sheath. The cable with a structure which is terminated by the outer sheath forms a pre-assembled unit. Basically, it is possible to combine this pre-assembled cable with further cables to form a composite cable or cable harness. The high proportion of air is preferably produced by virtue of the fact that the jacket is foamed.

This embodiment is based here on the underlying concept of ensuring a necessary distance from, for example, an adjacent data cable by means of this jacket which is embodied as an outer sheath, in order, therefore, to minimize, for example, crosstalk effects by this means. Such problems occur in this context in particular in low-cost applications, for example in the field of motor vehicles in which costly screening measures etc. for reducing such effects are usually dispensed with.

As a result of the application of the jacket with a high proportion of air, adjacent data cables are therefore kept at a sufficiently large distance. At the same time, the use of material for this jacket is comparatively low as a result of the high proportion of air. The same also applies to the weight of the data cable. Overall, as a result unnecessary consumption of material is avoided and the costs are kept low.

According to one preferred development, the intermediate sheath is embodied as a solid sheath made of a suitable insulating material, for example of TPE S. The desired mechanical properties such as, for example, tensile strength etc. can be adjusted through the embodiment of the solid intermediate sheath.

Alternatively, the intermediate sheath is also embodied with a high proportion of air and is preferably embodied as a foamed sheath. In this specific case, two foam layers are therefore embodied as an intermediate sheath and jacket.

The intermediate sheath has a wall thickness preferably in the range from 0.3 mm to 1 mm and preferably of 0.5 mm. The wall thickness of the outer sheath is preferably in the range from 0.2 mm to 0.8 mm. In particular, the outer sheath has a smaller wall thickness than the intermediate sheath.

In a particularly expedient development, the jacket is embodied so as to be easily separable from the intermediate sheath. For this purpose, the jacket and the intermediate sheath are expediently composed of different materials which are connected to one another only to a small extent and are, for example, polar or non polar. Alternatively or additionally, a separating agent, for example in liquid form or else in powder form, in particular in the form of stearates is introduced between the jacket and the intermediate sheath.

This embodiment is based on the idea of arranging the jacket merely in intermediate regions between two ends of the cable and removing the jacket at the end regions in order to be able to connect the data cable to standard plugs. As a result, there is therefore overall the possibility of using data cables with a relatively large outer diameter for the transmission link while retaining the standard plugs, which permit, for example, a maximum outer diameter of 3 mm, with the result that the individual transmission cores of two adjacent data cables in one cable harness are spaced apart as far as possible from one another. At the same time, the diameter is reduced to the necessary outer diameter only in the region of the plug.

Correspondingly, it is expediently also provided that a plug is fitted to the end, wherein the jacket is removed in the region before the plug and only the data cable with the intermediate sheath is introduced into the plug.

For this embodiment it is not absolutely necessary in this context for the intermediate sheath and jacket to be easily separable from one another. The separation of the jacket or even parts thereof to a desired remaining final diameter in the region of the plug can also be carried out by means of suitable removal machines, for example by means of a stripping process etc.

In the case of the foamed embodiment, the foamed jacket is expediently bounded at least on one side, and preferably on both sides, by a thin skin layer, with the result that the jacket is, in particular, closed toward the outside and is not open-pored. The skin layer preferably has a wall thickness in the region of merely 0.25 μm to, for example, 100 μm here. In contrast, the minimum wall thickness of the foamed material of the jacket is in the region of 0.2 mm.

According to one alternative embodiment to the first basic variant, the jacket according to a second basic variant surrounds the transmission core directly.

This second basic variant is based on the idea of not arranging a solid sheath in the direct neighboring region of the conductor pair or of the star quad but instead arranging a jacket which has a high proportion of air/gas, with the result that the high-frequency fields of the signal which propagates in the data cable, which enter into these near surroundings of the jacket, are disrupted and damped as little as possible.

The jacket is expediently also surrounded by an additional outer sheath, in particular sheathed directly. Said outer sheath is preferably embodied in a solid fashion and is preferably embodied from an HF-compatible material. The jacket is therefore embodied in the manner of an intermediate sheath which is embedded between the transmission core and the outer sheath. The outer sheath serves to protect against external environmental influences.

However, in one preferred embodiment the jacket which directly surrounds the transmission core itself forms the outer sheath. Therefore, only the jacket with the high proportion of air is arranged. Further sheaths which are arranged concentrically with respect to the transmission core are preferably not formed. As a result, good transmission properties can be obtained with a low usage of material.

In this context, the jacket is preferably formed by the at least one spacer element which is embodied, in particular, in the manner of a hose-like element which surrounds the transmission core. This hose-like element thereof has free air regions here, with the result that the annular space which is in the form of a sheath and which is formed by the hose-like element encloses a high proportion air.

In this context, the hose-like element is preferably extruded onto the transmission core, with the result that a simple and cost-effective manufacture is made possible.

The hose-like element is expediently formed by a plurality of (plastic) threads or strands which are connected to one another in order to form a mesh, a spunbonded fabric or a screen-like enclosure. In particular, said element is an extruded spunbonded fabric.

For both basic variants mentioned above, the preferred developments which are cited below apply equally.

The ratio between a dielectric value of the conductor insulation and a dielectric value of the jacket is therefore preferably in the range from 1.4 to 1.8 and is, in particular, approximately 1.5. In particular, the conductor insulation has a dielectric value in the range from 2.0 to 2.6, and the jacket has a dielectric value in the range from 1.4 to 1.7. As a result of this measure, a suitable orientation of the so-called Poynting vector toward the inside is achieved, similarly to the case of a Goubau line, with the result that the data transmission has less loss overall. The jacket is, in particular, the foamed sheath.

Furthermore, the jacket has at least a wall thickness in the range from 0.25 mm to 2.2 mm. In particular, the minimum wall thickness ensures that the high-frequency fields which penetrate the jacket extend as far as possible only in the region of the jacket.

The jacket also expediently comprises an HF-compatible material or is composed of such a material. This is, in particular, a nonpolar material, for example the jacket has plastics such as, for example, PE, PP, TPE S or FEP. In addition, the negative effect of polar materials is also attenuated by the high proportion of air.

If HF-compatible material is mentioned here, it is understood to refer generally, in particular, to a material with only a low dielectric loss factor at high frequencies. In particular, the loss factor is (in the case of 1 MHz) in the region of approximately less than 20*10 4; in particular less than 5*10 4 or even less than 1*10 4 (according to IEC60250).

In an expedient embodiment, the jacket itself is embodied as a foamed sheath. As a result of this measure, a high proportion of air or gas is therefore introduced into the jacket by the foaming process. As a result, the transmission properties are significantly improved compared to a solid sheath.

Said jacket expediently has here a degree of foaming in the range from 25 to 80%. Degree of foaming is understood here to be the ratio of the proportion of the volume of the enclosed air with respect to the proportion of the volume of the material.

Furthermore, the foamed jacket has a density in the range from 0.3 to 0.75 g/cm3, in particular for relatively light-weight materials such as PE, PP, or a density in the range from 0.65 to 1.8 g/cm3, in particular for relatively heavy materials such as FEP.

The jacket is preferably composed of a plurality of zones, in particular two or three zones, composed of plastics which are foamed to differing (high) degrees, wherein the (radially) inner zones are preferably embodied with a higher degree of foaming (smaller density) than the outer zones. The different zones can here also form an intermediate sheath and an outer sheath, with the result that the two basic variants are combined with one another.

As an alternative to the embodiment of the jacket as a foamed sheath, the jacket has at least one spacer element which preferably directly surrounds the transmission core and typically also bears against it. The spacer element itself is interrupted here and has a high proportion of air and is therefore not embodied as a solid hose-like element or an element in the form of a sheath. The outer sheath, which, in particular, directly sheaths the spacer element, can be provided around this spacer element. The outer sheath is, in particular, in turn composed of a solid material here. However, an additional outer sheath does not necessarily have to be formed. There is also the possibility of just arranging the spacer element and/or that the spacer element itself forms a sheath. The spacer element itself is composed of an HF-compatible material.

According to a first embodiment variant, the spacer element is embodied here in the manner of an element in the form of a hose, for example a (cable) screen or mesh and is arranged/placed around the transmission core. The spacer element is preferably embodied here in the manner of a C screen.

The screen or the element in the form of a hose has here only a small extent of coverage in the region of preferably less than 75%. In particular, the extent of coverage is in the range from 10% to 60%.

The element in the form of a hose comprises, overall, (plastic) threads or strands which are connected to one another, preferably a mesh screen, which is formed from individual plastic threads. The plastic threads are composed here in turn of the HF-compatible material.

In a further alternative embodiment, the spacer element is finally embodied in the manner of a hose-like spunbonded fabric which surrounds the transmission core. Said spunbonded fabric is preferably composed here of solid or else foamed plastic.

The at least one spacer element generally, and, in particular, the spunbonded fabric are expediently formed here by means of extrusion and are, in particular, also applied directly to the transmission core by means of an extrusion process. The spunbonded fabric comprises here, in particular, individual plastic strands which form a type of network by means of a special extrusion process. Such extruded spunbonded fabrics are used, for example, as packing materials.

Basically, other hose-like structures which surround the transmission core and which have only a small extent of coverage and therefore a high proportion of air can also be used. The thickness of the hose-like elements and therefore the radial extent of the spacer element are here, in particular, in the region of the wall thickness of the jacket specified above, that is to say, in particular, in the range from 0.2 mm to 2.2 mm.

This thickness also applies to the embodiment variants specified below for the spacer element.

According to an alternative embodiment variant, said spacer element has at least one strand, in particular composed of a plastic composed of an HF-compatible material, which is wound around the transmission core. The plastic strand is here expediently embodied with the opposite lay to a stranding direction of the conductor pair or of the transmission core, with the result that the strand does not enter the interstice between the conductors. The strand is preferably surrounded by an outer sheath, in particular a sheath which is extruded in the form of a hose.

The preferably extruded spacer element is here generally solid or composed from a foamed material. It is produced during manufacture, for example in the case of embodiment as a wound strand, in particular by virtue of the fact that an extruder or an extrusion head rotates.

A lay length of the transmission core and a lay length of the wound plastic strand expediently have a ratio of a primary number with respect to one another. As a result, reliably periodic interference is avoided.

In one alternative embodiment, the spacer elements are part of a sheath and are preferably arranged protruding radially inward on an inner side of the sheath. They preferably have a sufficiently large radial length here, with the result that a sufficient free space is formed between two successive spacer elements when considered in the circumferential direction. When considered in the cross section, the spacer elements are embodied, for example, in a semicircular or triangular fashion or else in a trapezoidal shape. They therefore generally taper in the direction of the transmission core. As a result of this embodiment, the spacer elements therefore center and hold the transmission core centrally. The radial length of the spacer elements corresponds here preferably in turn to the wall thickness of the jacket specified above. It is preferably in the range from 0.2 to 0.8 times the maximum wall thickness of the sheath.

In order to ensure the largest possible occlusion of air only a small number of spacer elements are also integrally molded on. In particular, only four, six or at maximum eight spacer elements are arranged distributed around the inner circumference of the sheath. The spacer elements are preferably arranged distributed uniformly here. For reasons of symmetry, the number of spacer elements is expediently an even number.

In order to ensure the most accurate possible concentric guidance of the transmission core and, in particular, of only one conductor pair relative to the sheath, the transmission core is guided rotated relative to the sheath with the integrally molded-on spacer elements. The individual conductors are there-fore guided extending in a helix-like fashion inside the sheath, with the result that said conductors are supported periodically on the individual spacer elements and reliably guided centrally by means of the latter as a result.

In a further alternative embodiment, the jacket comprises a hollow hose in which the transmission core/the conductor pair does not extend linearly but instead is guided in corrugations or in a zigzag shape, with the result that, in particular, periodically recurring support points of the transmission core are formed on the inner wall of the hollow hose. The transmission core therefore bears only on apex points.

Other features which are considered as characteristic for the invention are set forth in the appended claims.

Although the invention is illustrated and described herein as embodied in a data cable and its incorporation into a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
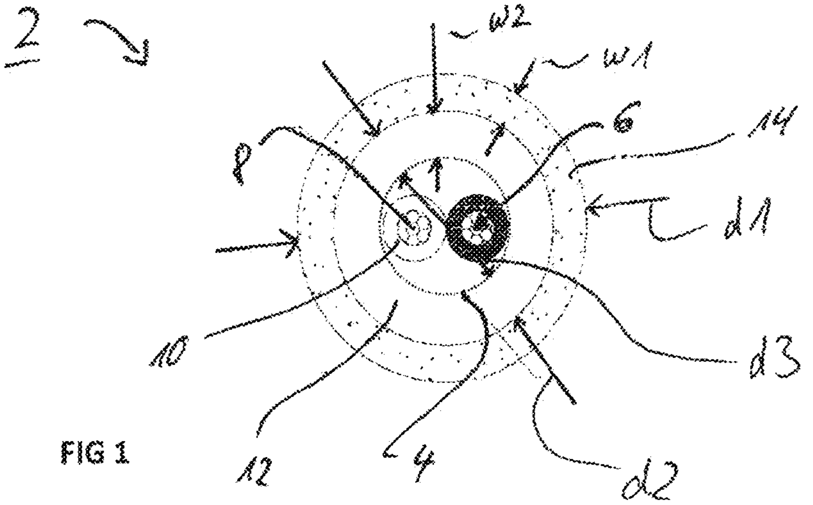
FIG. 1 is a cross-section taken through a data cable according to a first basic variant with a foamed outer sheath.

Referring now to the figures of the drawing in detail, all the data cables 2 which are described below are cables preferably for symmetrical signal transmission in which the signal is transmitted over one line of a line pair, and an inverted signal is transmitted over the other line of a line pair. The data cable 2 is preferably a non-screened data cable 2, that is to say, it does not have any screening. It has a comparatively simple structure. The data cable 2 in the exemplary embodiments has only a single conductor pair as a transmission core 4. The conductor pair is composed here of two conductors 6 which are each formed by a line 8 and a conductor insulation 10 which surrounds it concentrically. The two conductors 6 are stranded to one another, that is to say twisted together, with a lay length.

The conductor insulation 10 is preferably composed of polypropylene, and the line 8 is, in particular, a stranded conductor. The individual wires of the stranded conductor are embodied, in particular, as copper wires and are preferably tin-plated.

As an alternative, the transmission core 4 can be formed by a quad stranded assembly, in particular a so-called star quad, in which two conductors 6 which are located diagonally opposite one another define the conductor pair for the symmetrical data transmission. The four conductors 6 are stranded to one another. The conductors 6 bear with their conductor insulations 10 directly against one another. A filler strand can be arranged in the center in order to ensure the high level of symmetry which is desired for an interference-free signal transmission.

Overall, a high degree of symmetry with such a non-screened data cable 2 is sought and realized, in order to ensure an interference-free signal transmission.

In the first basic variant illustrated in FIG. 1, the transmission core 4 is first surrounded directly by an intermediate sheath 12 which is in turn surrounded by a foamed outer sheath 14. The data cable 2 preferably does not have further layers. The intermediate sheath 12 is preferably a solid intermediate sheath 12. Alternatively, it can also be a foamed intermediate sheath 12. Both the intermediate sheath 12 and the outer sheath 14 are preferably applied by way of an extrusion process.

The intermediate sheath is composed, for example, of TPE S (thermoplastic elastomer, styrenic block copolymers). In the exemplary embodiment, the foamed outer sheath 14 is composed of polypropylene.

Owing to the foamed embodiment, the outer sheath 14 forms a jacket with a high proportion of air. The degree of foaming is here, in particular, at least approximately 50%.

The outer sheath 14 has a wall thickness w1 which is in the range from 0.2 to 0.8 mm and is preferably in the region of 0.5 mm. The intermediate sheath 12 has an average wall thickness w2 which is in the range from 0.3 to 1 mm and is in particular approximately 0.5 mm. It is preferably somewhat larger than the wall thickness w1 of the outer sheath 14. The average wall thickness w2 is understood here to be the difference between the radii of the transmission core 4 and the outer radius of the intermediate sheath 12, as is apparent from FIG. 1. In view of the desired high degree of symmetry, the intermediate sheath 12 surrounds the transmission core 4 strictly concentrically. In this context, during the extrusion process sheath material of the intermediate sheath 12 also penetrates the interstices between the two conductors 6. The outer sheath 14 is also arranged strictly concentrically.

The entire data cable 2 has an outer diameter d1 which is defined by the outer diameter of the outer sheath 14. Furthermore, the intermediate sheath 12 has a diameter d2, and the transmission core has a diameter d3. The latter is usually in the range between 1.5 and 2.2 mm and is in particular approximately 1.8 mm. The diameter d2 of the intermediate sheath 12 is in the range from 2.8 to 3.4 mm and is preferably approximately 3 mm. The total outer diameter d1 is approximately 0.8 to 2 mm and in particular approximately 1 mm above that, with the result that overall there is a total outer diameter d1 of approximately 3.6 to 5.5 mm and preferably of approximately 4 mm.

It is henceforth of particular significance that the diameter d2 of the intermediate sheath corresponds to a standard outer diameter such as is necessary for standard plugs in such Ethernet lines which are used in the field of automobiles.

Figure 2:
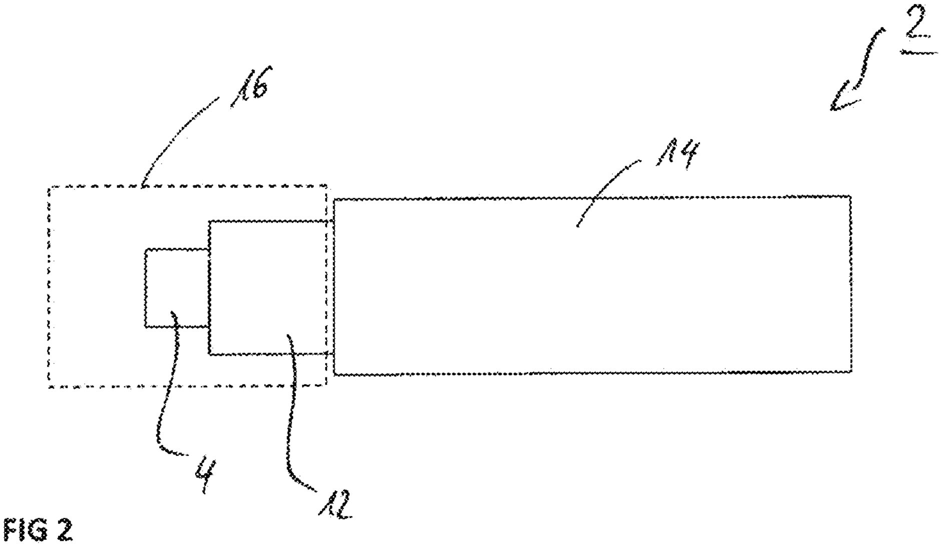
FIG. 2 shows a side view of the data cable illustrated in FIG. 1 with fitted-on plug indicated.

When a plug 16 such as is indicated in a highly simplified form, for example, in FIG. 2 is assembled, firstly only the outer sheath 14 is removed in the end region over, for example, several centimeters and the data cable 2 is only introduced with the intermediate sheath 12 into the plug 16. For the necessary assembly, the outer sheath 14 is preferably easily separable from the intermediate sheath 12 here. This is achieved, for example, by means of different materials for these two sheaths 12, 14 and/or by providing a separating layer between these two sheaths 12, 14.

The data cable 2 which is described in FIGS. 1 and 2 provides overall the particular advantage that as a result of the arrangement of the outer sheath 14 with the high proportion of air and the specific dimensioning of the intermediate sheath 12 to the standard measure of 3 mm a data cable 12 which is improved with respect to the signal transmission quality is made available and at the same time it is possible to have recourse to standard assembly elements such as the plug 16. In particular an input of energy of an interfering source coming from the outside is at least reduced by the outer sheath 14 and the resulting increased dimensioning and surface of the data cable 2. At the same time, the amount of material required and the additional weight is kept as low as possible by virtue of the foamed outer sheath 14. The sensitivity with respect to the so-called alien-next is therefore reduced.

The embodiment variants which are illustrated in the further figures represent different embodiment variants of a second basic variant in which the jacket with the high proportion of air is arranged directly around the transmission core 4.

Figure 3A:
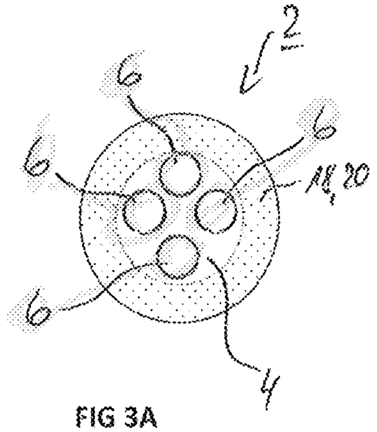
FIG. 3A shows a cross-sectional illustration of a data cable according to a second basic variant, in which a spunbonded fabric, as a jacket with a high proportion of air, directly surrounds a transmission core and at the same time defines the outer sheath.
Figure 3B:
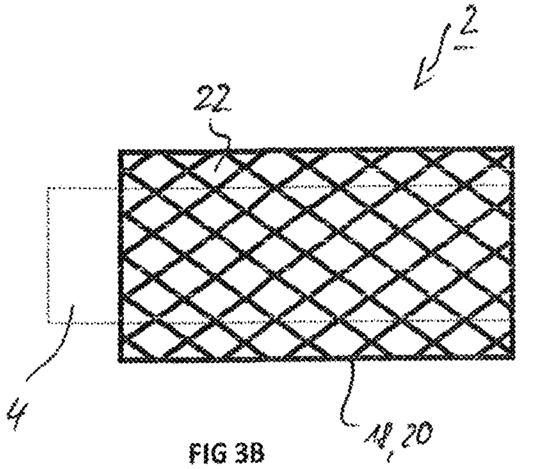
FIG. 3B shows a side view of the data cable according to FIG. 3A.

In the exemplary embodiment illustrated in FIGS. 3A and 3B, this jacket forms at the same time an outer sheath 18. The entire data cable 2 is therefore formed merely by the transmission core 4 and the outer sheath 18 thereof. FIG. 3A also illustrates a four-conductor, starquad cable. It should be understood that the embodiment of FIG. 3A may also contain two conductors; at the same time, the embodiment of FIG. 1 may be a starquad cable.

The outer sheath 18 is, in particular, a hose-shaped element in the form of a spunbonded fabric 20 which is extruded onto the transmission core 4. This outer sheath 18 is therefore characterized by individual strands which cross one another and which are therefore embodied, for example, in the form of a grid and enclose free air spaces 22 between them. In this context, a solid or else a foamed HF-compatible plastic is used as the material for the spunbonded fabric 20. Such extruded spunbonded fabrics are known as packing materials. They are produced by two perforated disks which rotate in opposite directions in an extruder. In order to form the structure, in particular two so-called D braiding elements running in opposite directions are bonded to one another at the intersection points.

The conductors 6 of the transmission core 4 are basically suitable to be used even without a solid outer sheath. This is exploited by the exemplary embodiment in FIGS. 3A and 3B, since additional protection via a solid outer sheath is not absolutely necessary. At the same time, an improved data transmission owing to relatively low signal attenuation is achieved by virtue of the outer sheath 18 which is embodied as a jacket with a high proportion of air.

The dimensions of the data cable 2 are in turn comparable with those according to FIG. 1. The trans-mission core 4 is here embodied in an identical way and the outer sheath 18 has here a diameter d2 which corresponds to the diameter d2 of the intermediate sheath 12 in the embodiment variant of FIG. 1. The outer sheath 18 according to FIG. 3A therefore has a diameter d2 of approximately 3 mm, with the result that the data cable 2 is suitable for standard plugs 16.

The spunbonded fabric 20 forms in total a spacer element. This spunbonded fabric 20 therefore forms a spacer with respect to, for example, adjacent data cables 2 or else ground potentials (vehicle bodywork) and other components. As a result of the embodiment of the outer sheath 18 as a spunbonded fabric, material and weight are saved compared to solid outer sheaths.

Figure 4A:
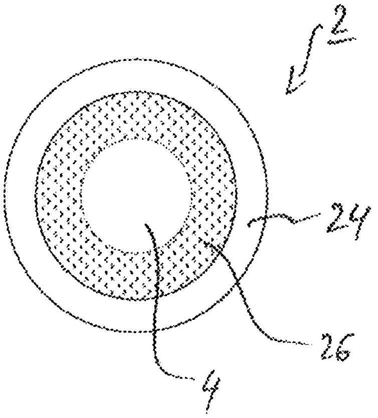
FIG. 4A shows a further embodiment variant of the second basic variant with a jacket which is foamed directly around the transmission core and has an additional outer sheath.
Figure 4B:
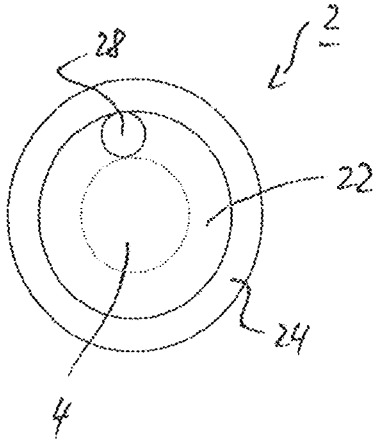
FIG. 4B shows a further embodiment variant in which a plastic strand which is wound with an opposite lay is arranged between the trans-mission core and the outer sheath in order to form the jacket with a high proportion of air.
Figure 4C:
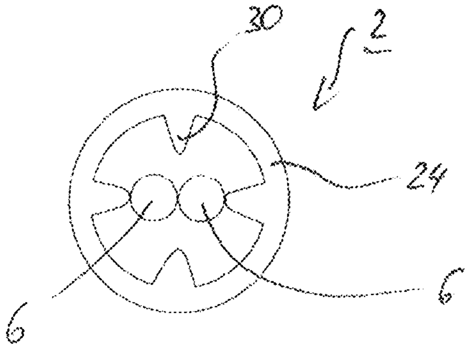
FIG. 4C shows a cross-sectional illustration through a further variant in which radially inwardly directed spacers, which center the transmission core, are integrally molded onto the outer sheath.

In the further exemplary embodiment according to FIGS. 4A, 4B and 4C, the jacket with a high proportion of air is also additionally surrounded by an, in particular, solid outer sheath 24.

In the embodiment variant according to FIG. 4A, a foamed intermediate sheath 26 is concentrically applied to the transmission core 4 here before the latter is surrounded by a preferably solid outer sheath 24.

In FIG. 4B, in order to form the jacket with the high proportion of air a plastic strand 28 is applied which is arranged in a helical shape around the transmission core 4 and therefore keeps the outer sheath 24 at a distance from the transmission core 4. The intermediate space between the transmission core 4 and the outer sheath 24 is formed by the free air space 22. As a result of the application of the plastic strand 28 with the opposite lay to the stranding direction of the conductors 6, the plastic strand 28 is reliably prevented from sagging in an interstice between the conductors 6. As a result, the desired high degree of symmetry is ensured. Subsequently, the outer sheath 24 is connected as a prefabricated hose onto this transmission core 4 which is provided with the plastic strand 28. Overall, this embodiment variant permits a very small usage of material with at the same time a high proportion of air in the jacket.

As an alternative to the embodiment of the plastic strand 28 as a spacer element, in a way which is not illustrated in more detail here a hose-like element, similar for example to the spunbonded fabric 20, is applied around the transmission core 4. This can be the spunbonded fabric 20 shown in FIG. 3B or else a mesh or some other hose-like structure with free air spaces 22. In particular, a so-called C screen as a mesh composed of plastic threads is applied. The outer sheath 24 is also preferably applied in a hose extrusion or semi-hose extrusion here.

FIG. 4C shows an embodiment variant in which individual spacer elements 30 are integrally molded onto the outer sheath 24 so that they extend radially inward. The spacer elements 30 taper here in the direction of the transmission core 4, with the result that they have a preferably rounded tip, with the result that they make contact with the conductors 6 as far as possible only in a punctiform fashion. In order to form the spacer elements 30, corresponding protrusions are formed in an extrusion mouthpiece which is used for the extrusion of the outer sheath 24. These protrusions remain at the identical point during the manufacturing process. At the same time, owing to the stranding the conductor pair rotates, and the rotation of the conductor pair therefore guides said conductor pair precisely in the center of the outer sheath 24. The conductor pair therefore cannot slip into the gaps in the outer sheath 24.

In order to achieve the highest possible proportion of air, only a small number of spacer elements 30, in particular at maximum eight and preferably only four spacer elements 30, are expediently used here. In view of the desired high degree of symmetry, an even number is used here. In terms of manufacturing equipment, this embodiment can be fabricated on conventional extruders, and is defined by a high degree of mechanical stability and good processability, since no additional working steps are necessary for the assembly of a plug 16. The diameter of the outer sheath 24 preferably corresponds here in turn to the standard diameter of approximately 3 mm.

Finally, in an alternative embodiment variant, which is not specifically illustrated in more detail, the outer sheath can be embodied as a hollow hose into which the stranded conductor pair is laid in a corrugated shape or zigzag shape. As a result, the transmission core 4 bears against the outer sheath only at the apex points of the recurring deformation.

In the embodiment variants described here, an HF-compatible material is selected for the respective jacket. In the embodiment variants with the formed sheath, gas or air is introduced as virtual occlusions through either chemical or physical foaming processes. In particular, in the embodiment variant in FIG. 1, the foamed outer sheath 14 has at least also a thin skin layer to counteract mechanical stresses. This thin skin layer is sealed. In order to manufacture the foamed sheath, an extrusion line with the possibility of physical foaming or a sheath material which is provided with a blowing agent is used for the extrusion.

The data cable 2 which is described here is used, for example with further cables or lines in a common cable harness, in a motor vehicle as part of the on-board power system.

The following is a summary list of reference numerals and the corresponding structure used in the above description of the invention:

2 Data cable
4 Transmission core
6 Conductors
8 Line
10 Conductor insulation
12 Intermediate sheath
14 Outer sheath
16 Plug
18 Outer sheath
20 Spunbonded fabric
22 Free air space
24 Outer sheath
26 Foamed intermediate sheath
28 Plastic strand
30 Spacer element
d1 Outer diameter
d2 Diameter
w1 Wall thickness
w2 Wall thickness

The invention claimed is:

1. A data cable, comprising:

a transmission core having a single stranded conductor pair or four conductors that are stranded to form quad stranding, each conductor having a line and a conductor insulation sheathing said line;

a jacket with a high proportion of air surrounding said transmission core, said jacket being selectively formed by a foamed sheath or at least one spacer element which defines an annular sheath space with free air spaces around said transmission core;

an intermediate sheath disposed between said transmission core and said jacket with a high proportion of air;

said jacket being a foamed outer sheath and said jacket being insulated from said intermediate sheath; and said jacket and said intermediate sheath being composed of mutually different materials that are not connected to one another or are connected to one another only to a small extent, and/or having a separating agent introduced between said jacket and said intermediate sheath.

2. The data cable according to claim 1, which comprises a plug fitted to an end of the data cable, wherein the jacket is removed in front of said plug and only said intermediate sheath projects into said plug.

3. The data cable according to claim 1, wherein said jacket is a foamed jacket with a closed skin layer at least on an outer side thereof.

4. The data cable according to claim 1, wherein said jacket with the high proportion of air is applied around said transmission core.

5. The data cable according to claim 4, wherein said jacket forms an outer sheath.

6. The data cable according to claim 1, wherein said at least one spacer element is a hose-shaped element surrounding said transmission core.

7. A data cable, comprising:

a transmission core having a single stranded conductor pair or four conductors that are stranded to form quad stranding, each conductor having a line and a conductor insulation sheathing said line;

a jacket with a high proportion of air surrounding said transmission core, said jacket being selectively formed by a foamed sheath or at least one spacer element which defines an annular sheath space with free air spaces around said transmission core, wherein said spacer element is a spunbonded fabric which surrounds said transmission core.

8. The data cable according to claim 1, wherein a ratio between a dielectric value of said conductor insulation and said jacket lies in a range from 1.4 to 1.8.

9. The data cable according to claim 4, wherein said conductor insulation has a dielectric value in a range from 2.0 to 2.6, and said jacket has a dielectric value in a range from 1.4 to 1.7.

10. The data cable according to claim 1, wherein said jacket has a wall thickness in a range from 0.25 mm to 2.2 mm.

11. The data cable according to claim 1, wherein said jacket has a degree of foaming in a range from 25% to 80%.

12. A data cable, comprising:

a transmission core having a single stranded conductor pair or four conductors that are stranded to form quad stranding, each conductor having a line and a conductor insulation sheathing said line;

a jacket with a high proportion of air surrounding said transmission core, said jacket being selectively formed by a foamed sheath or at least one spacer element which defines an annular sheath space with free air spaces around said transmission core, wherein said jacket is composed of an HF-compatible, nonpolar material.

13. The data cable according to claim 12, wherein said foamed sheath has a density in a range from 0.3 to 0.75 $g/cm^3$ for relatively lightweight materials, or a density in a range from 0.65 to 1.8 $g/cm^3$ for relatively heavy materials.

14. The data cable according to claim 1, wherein said jacket sheath is composed of a plurality of zones of differently foamed plastics, the zones including inner zones formed with a relatively higher degree of foaming and outer zones formed with a relatively lesser degree of foaming.

15. The data cable according to claim 1, wherein said at least one spacer element is formed as:

a hose arranged directly around said transmission core; or at least one plastic strand which is wound around said transmission core; or a spacer element that is integrally molded onto a sheath in the radial direction.

16. The data cable according to claim 15, wherein said hose is a screen, a mesh or a spunbonded fabric formed directly around said transmission core; or said at least one plastic strand is wound around said transmission core with an opposite lay to a stranding direction of said transmission core.

17. The data cable according to claim 15, wherein said spacer formed as a hose element has a small extent of coverage in a region of less than 75%.

18. The data cable according to claim 15, wherein a lay length of said transmission core and a lay length of said wound plastic strand have a ratio of a prime number with respect to one another.

19. The data cable according to claim 15, wherein no more than eight spacer elements are integrally molded onto said sheath.

20. The data cable according to claim 15, wherein said at least one spacer element is extruded onto said transmission core.

21. The data cable according to claim 1, wherein said jacket comprises a hollow hose in which said transmission core is guided in corrugations or in a zigzag shape, with said transmission core bearing against said hollow hose at a deformation thereof.

22. A motor vehicle, comprising a data cable according to claim 1.

* * * * *